United States Patent Office 3,250,771
Patented May 10, 1966

3,250,771
5-MONOCARBOCYCLIC ARYL-N-LOWER ALKYL-2-PYRROLIDINE CARBOXYLIC ACID, ESTERS, AMIDES AND DERIVATIVES THEREOF
Frederick Leonard, Rockville, Md., and Norbert Gruenfeld, Bronx, N.Y., assignors to Geigy Chemical Corporation, Greenburgh, N.Y., a corporation of Delaware
No Drawing. Filed Dec. 10, 1964, Ser. No. 417,517
10 Claims. (Cl. 260—247.5)

This application is a continuation-in-part of a sole application by Frederick Leonard, Serial No. 244,903, filed on December 17, 1962, now U.S. Patent No. 3,164,597.

This invention relates to certain novel derivatives of pyrrolidine, which possess valuable pharmacological properties and are useful as pharmaceutical agents. This invention also pertains to processes for their manufacture.

More particularly, this invention pertains to 1-(lower)-alkyl-2,5-disubstituted pyrrolidines which may be represented by the following general formula:

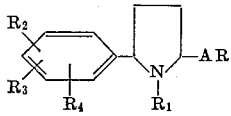

In this formula:

A stands for CO or $CH_2$;
R represents hydroxy, lower-alkoxy, aryl-lower-alkoxy, amino, hydrazino, lower-alkylamino, di-lower-alkylamino or such heterocyclic radicals as pyrrolidyl, piperidyl, morpholinyl, piperazinyl or lower-alkyl or aryl-substituted piperazinyl, etc.;
$R_1$ is lower alkyl;
$R_2$, $R_3$ and $R_4$ denote hydrogen, halogen—preferably, chorine and bromine—hydroxy, amino, lower alkyl, lower alkoxy, or methylenedioxy when two adjacent R symbols are joined together.

The term "lower alkyl" as used herein per se and as included in the term "lower alkoxy" means saturated monovalent aliphatic radicals of the general formula $-C_mH_{2m+1}$ wherein $m$ designates an integer of less than six and is inclusive of both straight-chain and branched-chain radicals. The term "aryl" as used herein means monocarbocyclic aryl, particularly, phenyl or phenyl substituted by halogen, such as fluorine, chlorine, bromine; lower alkyl; lower alkoxy; trifluoromethyl; etc.

The compounds of this invention may be conveniently synthesized by reactions involving first the cyclization of an appropriate amino keto acid, generated in situ by hydrolysis of a di-lower-alkyl or di-aryl-lower-alkyl acylamido-3-oxopropyl malonate, yielding the carboxy derivative of a pyrroline which can then be readily converted to the corresponding ester and amide. These derivatives can next be alkylated in the 1-position and the corresponding pyrrolidine derivatives can be obtained by hydrogenation of the 1-alkyl pyrrolinium derivatives. The pyrrolidine derivatives can be converted by reduction to compounds of Formula I wherein A is $CH_2$.

More specifically, the subject compounds may be made by the following syntheses:

2-(substituted)-phenylpyrroline-5-carboxylic acids are formed (1) by refluxing di-lower-alkyl or di-aryl-loweralkyl acylamido-3-(substituted)pheny-3-oxopropyl malonates with mineral acid, such as, hydrohalic (hydrochloric or hydrobromic) or sulfuric acid. The treatment with mineral acid causes hydrolysis, cyclization and decarboxylation. These carboxy derivatives of pyrroline can be esterfied (2) by any known esterification procedures, as for example, by refluxing with lower alkanol and sulfuric acid. The ester obtained, namely, lower alkyl 2-(substituted)phenylpyrroline -5-carboxylate, can be converted (3) to corresponding amides, i.e., 2-(substituted) phenylpyrroline-5-carboxyamides by a well known procedure which involves aminolysis.

The acid, ester or amide derivatives of the 2-(substituted)phenyl pyrrolines can be alkylated (4) in the 1-position under reflux in an inert solvent to quaternary salts, i.e. pyrrolinium compounds, with alkyl halides, e.g., methyl, ethyl, propyl iodides or bromides, etc.

The conversion of the pyrrolinium compounds to 1-lower-alkyl-5-(substituted)phenyl pyrrolidine-2-carboxylic acids, -carboxylic acid esters and -carboxamides can be carried out (5) by catalytic hydrogenation, as for example, in a Parr hydrogenator using platinum oxide or such other equivalent metal catalysts as palladium, rhodium, nickel, etc., at room temperatures or slightly elevated temperatures and at atmospheric or slightly above-atmospheric pressures or by chemical reduction, e.g. borohydride reduction, etc.

From these 1-lower-alkyl-5-(substituted)phenyl pyrrolidine-2-carboxylic acids, -carboxylic acid esters and -carboxamides corresponding pyrrolidines of Formula I wherein A is $CH_2$ and the other symbols used are as defined hereinabove, can be obtained (6) by further chemical reduction, using, e.g., lithium aluminum hydride, diborane, etc.

The above syntheses can be illustrated by the following equations:

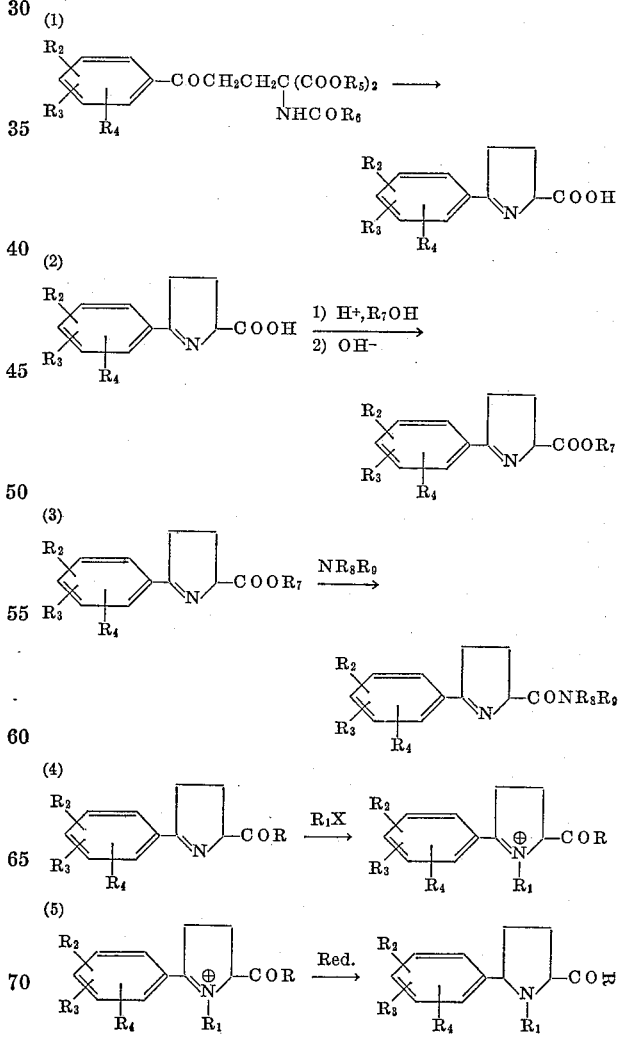

(6)

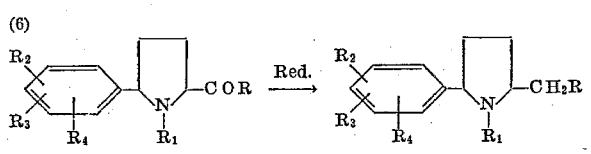

The symbols R, $R_1$, $R_2$, $R_3$ and $R_4$ in the above formulae have the significance ascribed to them hereinabove; $R_5$ and $R_7$ stand for lower alkyl or lower aralykl; $R_6$ may be hydrogen, lower alkyl, aryl or lower aralkoxy; $NR_8R_9$ represents amino, hydrazino, lower alkylamino, di-loweralkylamino or such heterocyclic radicals as pyrrolidyl, piperidyl, morpholinyl, piperazinyl or lower alkyl- or arylsubstituted piperazinyl, etc.; and X represents halogen, e.g. bromine, chlorine or iodine.

Alternatively, the 5-carboxy-, 5-carboalkoxy- or 5-carboxamido-2-(substituted)phenylpyrrolines can be reduced first either by catalytic hydrogenation or by chemical reduction as described above to the corresponding pyrrolidine derivatives; these can subsequently be alkylated (for example, with formaldehyde-formic acid to obtain the 1-methyl derivatives) to the corresponding 1-lower-alkylpyrrolidine derivatives.

Alternatively pyrrolidine derivatives of Formula I wherein A is $CH_2$, R represents amino, hydrazino, loweralkylamino, di-lower-alkylamino or the heterocyclic moieties specified above, and $R_1$, $R_2$, $R_3$ and $R_4$ have the significance given to them above, can be produced from 1-lower-alkyl-5-(substituted)phenyl-2 - hydroxymethylpyrrolidines by converting the latter to the corresponding halides, tosylate or mesylate which are then condensed with ammonia, primary or secondary amines.

The present invention comprehends not only the above-described derivatives of pyrrolidine in its free base form, but it also includes pharmaceutically acceptable non-toxic acid addition salts which may be formed from said compounds in accordance with conventional practice, by using appropriate inorganic and organic acids, such as hydrohalic acids, especially hydrochloric and hydrobromic acids, sulfuric, methanesulfonic and phosphoric acids as well as acetic, aminoacetic, lactic, succinic, malic, aconitic, phthalic and tartaric acids.

As mentioned above, the subject compounds possess valuable pharmacological properties: they exhibit spasmolytic, hypotensive/anti-hypertensive and/or anti-secretory activities and can therefore be employed as anti-spasmodic, hypotensive/anti-hypertensive and/or anti-secretory agents in suitable dosage unit forms, i.e., in association with suitable pharmaceutical carriers adapted for administration per os, intravenously, etc.

Merely by way of illustration, the following pharmacological tests were conducted and data obtained:

SPASMOLYTIC EFFECTS

*Method.*—Isolated guinea pig ileums were suspended in Tyrode bath of 10 ml. The diminuation of the contraction induced by standard doses of barium chloride was measured.

*Results.*—1 μg./ml. of compound of Example 2 inhibits the barium chloride contraction by 14%; 5 μg./ml. inhibits the contraction by 60%. The effect obtained with this compound is equal to that of atropine.

HYPOTENSIVE EFFECTS

*Method.*—Cats were anesthetized with chloralose and arterial blood pressure registered by means of a Statham pressure transducer.

*Results.*—5–10 mg./kg. of the compound of Example 2 I.V. caused a blood pressure fall of 35% from the control. Compound of Example 5 caused approximately the same decrease of blood pressure in doses of only .3 mg./kg. I.V.

GASTRIC SECRETION

*Method.*—Shay rats were prepared by ligation of the duodenum under anesthesia. After six hours, the weight of the secreted material was measured in the stomachs and the pH was determined.

*Results.*—200 mg./kg. of compound of Example 2 reduced the weight of secreted material from 7.37 grams in controls to 1.77 grams in the rats treated with 200 mg./kg. of this compound intraduodenally. The pH rose from 1.38 in controls to 2.34 in the rats treated with this compound.

These new compounds and the methods for their preparation may be exemplified more fully by the following illustrative examples. The temperatures therein are given in degrees centigrade.

EXAMPLE 1

*Methyl 1-methyl-5-(3,4-dimethoxyphenyl)pyrrolidine-2-carboxylate hydrochloride*

(a) *3,4-dimethoxyacetophenone* was prepared in ca. 80% yield from acetovanillone by the method of Blicke and Johnson, J. Am. Pharm. Assoc. 45, 440 (1956); M.P. 51–52°, as reported.

(b) *3-dimethylamino-3',4' - dimethoxypropiophenone hydrochloride* was prepared from 3,4-dimethoxyacetophenone in ca. 65% yield as described by Mannich and Lammering, Ber. 55, 3518 (1922); M.P. 180–182°, as reported.

(c) *Diethyl acetamido-[3-(3,4 - dimethoxyphenyl) - 3-oxopropyl]-malonate.*—3-dimethylamino - 3',4' - dimethoxypropiophenone hydrochloride (49.2 g., 0.18 mole) was suspended in 150 ml. of anhydrous ethanol (dried by distillation over $CaH_2$), and 27.3 g. (0.22 mole) of dimethyl sulfate was added dropwise at room temperature. The reaction was allowed to proceed at room temperature for three hours with continuous stirring. Subsequent addition of 35.4 g. (0.16 mole) of diethyl acetamidomalonate, suspended in sodium ethoxide solution (prepared by dissolving 0.36 mole of sodium in 150 ml. of anhydrous ethanol), resulted in slightly exothermic reaction. The mixture was allowed to react at room temperature for one hour and was then heated under reflux for an additional hour. After cooling, the reaction mixture was added to 1000 g. of chipped ice. The desired product crystallized (59.5 g., M.P. 106–108°) in 89% yield. Recrystallization from isopropanol raised the M.P. to 107–109°.

(d) *2 - (3,4 - dimethoxyphenyl)pyrroline-5-carboxylic acid hydrochloride.*—The compound obtained under (c) above (35.0 g., 0.086 mole) was added to 175 ml. of 6 N hydrochloric acid and the suspension was heated under reflux for three hours. The resulting solution was filtered and evaporated to dryness under reduced pressure; the residue was further dried by distillation with benzene. Acetone (150 ml.) was added to the residue and crystallization occurred. The reaction product (25.1 g., 0.085 mole M.P. 220–223° dec.) was recrystallized twice from 250 ml. of acetone-water (4:1) and dried to give 16.8 g. of the desired compound; M.P. 215–216° (dec.).

Infrared spectrum: (KBr pellet) 5.72, 6.12, 6.25, 6.25, 6.57, 7.80μ.

Ultraviolet spectrum: $\lambda_{max.}^{MeOH}$ 335 mμ, 301 mμ, 237 mμ

(e) *Methyl 2 - (3,4-dimethoxyphenyl)pyrroline-5-carboxylate.*—2 - (3,4 - dimethoxyphenyl)pyrroline-5-carboxylic acid hydrochloric (34.3 g., 0.12 mole) was dissolved in 300 ml. of absolute methanol. Sulfuric acid (reagent grade, 30 ml.) was added and the mixture was heated under reflux for three hours. Methanol was then removed by distillation under reduced pressure and the remaining product was treated with saturated sodium carbonate solution (to pH 9) and extracted with chloroform (3 x 100 ml.). The combined chloroform extract was washed with water, dried over sodium sulfate and evaporated to dryness under reduced pressure. The oily residue was dissolved in isopropanol (50 ml.) and the product (22.8 g., M.P. 78–81°) crystallized. Recrystallization of 5 g. portion from isopropanol (10 ml.) yielded 3.3 g. of the desired compound; M.P. 79–81°.

Ultraviolet spectrum: $\lambda_{max.}^{MeOH}$ 299 m$\mu$ ($\epsilon$, 9,000), 270 m$\mu$ ($\epsilon$, 15,000), 226 m$\mu$ ($\epsilon$, 16,000).

(f) *1 - methyl - 2-(3,4-dimethoxyphenyl)-5-carbomethoxy-pyrrolinium iodide.*—A solution of methyl 2-(3,4-dimethoxyphenyl)pyrroline-5-carboxylate (10.5 g., 0.04 mole) and methyl iodide (56.4 g., 0.4 mole) in anhydrous benzene (100 ml.) was heated under reflux for 5 hours. The product which crystallized during reflux period was filtered off and washed with benzene; yield 12.6 g.; M.P. 164–166°.

Ultraviolet spectrum: $\lambda_{max.}^{MeOH}$ 240 m$\mu$, 297 m$\mu$, 335 m$\mu$.

If in this procedure, e.g., ethyl, propyl or butyl iodides or bromides are employed, the corresponding 1-ethyl-, 1-propyl-, or 1-butyl-substituted pyrrolinium iodides or bromides are obtained.

(g) *Methyl 1 - methyl-5-(3,4-dimethoxyphenyl)pyrrolidine-2-carboxylate hydrochloride Method A.*—A suspension of the above compound (f) (37.0 g., 0.091 mole) in methanol (reagent, 200 ml.) was hydrogenated at room temperature and 3 atm. pressure for 2 hours in the presence of Adams catalyst (0.5 g.). The catalyst was removed by filtration and the resulting solution was evaporated to dryness. The resulting oil was dissolved in water (100 ml.); the solution was neutralized to pH 9 with saturated sodium carbonate solution and extracted with chloroform (3 x 150 ml.). The chloroform extracted was washed with water, dried over sodium sulfate and evaporated to dryness to yield a liquid (23.5 g.). This was diluted with isopropanol (60 ml.), ethanolic hydrochloric acid (10 N, 10 ml.) was added and product crystallized (24.5 g., M.P. 182° dec.). Recrystallization from isopropanol (150 ml.) yielded colorless crystals (22.0 g., M.P. 182–183° dec.). Further recrystallization of a portion (5 g.) from isopropanol (30 ml.) yielded 4.2 g. of the desired compound; M.P. 182–183° dec.

Ultraviolet spectrum: $\lambda_{max.}^{MeOH}$ 275 m$\mu$ ($\epsilon$, 3000), 225 m$\mu$ ($\epsilon$, 9,000).

*Method B.*—A solution of sodium borohydride (0.10 mole) in methanol (150 ml.) was slowly added to a suspension of 1 - methyl-2-(3,4-dimethoxyphenyl)-5-carbomethoxy-1 pyrrolinium iodide (20.25 g., .05 mole) in methanol (150 ml.) while cooling. After addition was complete the mixture was heated under reflux for 30 minutes. The reaction mixture was cooled, the pH was adjusted to 5–6 with glacial acetic acid and water (100 ml.) was added. The methanol was removed by distillation under reduced pressure, the aqueous solution was rendered alkaline to pH 8–9 with saturated sodium carbonate solution. The mixture was extracted with chloroform (3 x 250 ml.). The chloroform extract was dried over sodium sulfate and evaporated to dryness to give 14.7 g. of an oil. Distillation under high vacuum yielded pure methyl 1 - methyl-5-(3,4-dimethoxyphenyl)pyrrolidine-2-carboxylate (11.1 g., B.P. 142–145°/0.01 mm., $n_D^{24}$ 1.5305). Treatment with ethanolic hydrochloric acid gave the hydrochloride, M.P. 182–183°.

EXAMPLE 2

*1-methyl-5-(3,4-dimethoxyphenyl)pyrrolidine-2-carboxamide hydrochloride*

Methyl 1-methyl-5-(3,4-dimethoxylphenyl)pyrrolidine-2-carboxylate hydrochloride (12.6 g., 0.04 mole) was dissolved in water (50 ml.). The solution was rendered alkaline (to pH 9) with saturated sodium carbonate solution and was extracted with chloroform (3 x 75 ml.). The chloroform extract was washed, dried over sodium sulfate and evaporated to dryness to yield an oil (11 g.). The crude product was dissolved in methanol (reagent, 100 ml.); the solution was saturated at ice bath temperature with ammonia and stored in a pressure bottle at room temperature for five days. The solution was evaporated to dryness, and the residue was crystallized from isopropanol (50 ml.) to yield the reaction product (10.4 g., M.P. 135–140°). Part of this (5.3 g., 0.02 mole) was dissolved in methanol (20 ml.) and ethanolic hydrochloric acid (9.9 N, 3 ml.) was added. The hydrochloride crystallized on standing (5.1 g., M.P. 228–230° dec.). Recrystallization from methanol (20 ml.) yielded 3.0 g. of the desired compound; M.P. 231–233° dec.

Ultraviolet spectrum: $\lambda_{max.}^{MeOH}$ 233 m$\mu$ ($\epsilon$, 10,000) 277 m$\mu$ ($\epsilon$, 3,300).

EXAMPLE 3

*1-methyl-5-(3,4-dimethoxyphenyl)pyrrolidine-2-carboxylic acid hydrochloride*

*Method A.*—A solution of methyl 1-methyl-5-(3,4-dimethoxyphenyl)pyrrolidine-2-carboxylate (2.8 g., 0.01 mole) in 3 N hydrochloric acid was heated under reflux for 3 hours. The resulting solution was treated with charcoal and evaporated to dryness. Crystallization from acetone yielded acid hydrochloride (2.8 g., M.P. 225° dec.). Recrystallization from ethanol; isopropanol yielded the desired compound, M.P. 219–220° dec.

Analysis for $C_{14}H_{20}ClNO_4$.—Calc'd: C, 55.22; H, 6.68; N, 4.64; Cl, 11.75. Found: C, 55.70; H, 6.91; N, 4.87; Cl, 11.48.

*Method B.*—A solution of 1-methyl-5-(3,4-dimethoxyphenyl)pyrrolidine-2-carboxylic acid hydrochloride (7.3 g.) in methanol was passed over a Dowex 3 column (ca. 150 g.). Elution with methanol (ca. 2 liters) and evaporation to dryness gave an oil (6.4 g.). Crystallization from acetone (20 ml.) gave the free amino acid (5.3 g., M.P. 133–135°).

Formaldehyde 37% (4.5 ml., 0.06 mole) was added to a cooled solution of 5-(3,4-dimethoxyphenyl)pyrrolidine-2-carboxylic acid (1.25 g., 0.005 mole) in 90% formic acid (4.7 ml., 0.1 mole). The mixture was heated under reflux for 8 hours. 3 N hydrochloric acid (2 ml.) was added and the solution was evaporated to dryness under reduced pressure. The residue was dissolved in methanol, and insoluble material was removed by filtration. The solution was evaporated to dryness and the residue was crystallized from isopropanol to give the desired acid hydrochloride (1.1 g., M.P. 220° dec.).

EXAMPLE 4

*1-methyl-5-(3,4-dimethoxyphenyl)-2-(morpholinomethyl)pyrrolidine*

A solution of methyl 1-methyl-5-(3,4-dimethoxyphenyl)pyrrolidine-2-carboxylate (8.4 g., 0.03 mole) in morpholine was heated under reflux for four days. The solution was evaporated to dryness under reduced pressure and the resulting oil distilled under high vacuum to give a crude product (6.0 g., B.P. ca. 200°/0.06 mm.). This product was dissolved in 50 ml. of anhydrous tetrahydrofuran and the solution was added dropwise to a suspension of lithium aluminum hydride (2.28 g., 0.06 mole) in tetrahydrofuran (50 ml.). The mixture was heated under reflux for 16 hours. The mixture was cooled in an ice bath. Water (2.5 ml.), then 5 N sodium hydroxide (2 ml.) and again water (8 ml.) were carefully added dropwise. The mixture was again heated under reflux for one-half hour and filtered; the resulting gel was washed well with chloroform (ca. 100 ml.); the combined chloroform-tetrahydrofuran solution was washed with water (2 x 10 ml.), dried over sodium sulfate and evaporated to dryness. The resulting oil was distilled under reduced pressure to give the desired compound (3.8 g., B.P. ca. 160°/0.1 mm.; $n_D^{25}$ 1.5395).

Ultraviolet spectrum: $\lambda_{max.}^{MeOH}$ 230 m$\mu$, 280 m$\mu$.

EXAMPLE 5

*1-methyl-5-(3,4-dimethoxyphenyl)-2-[4-phenyl-piperazino)methyl]pyrrolidine*

A solution of methyl 1-methyl-5-(3,4-dimethoxyphenyl)pyrrolidine-2-carboxylate (8.4 g., 0.03 mole) and 1-phenylpiperazine (24.3 g., 0.15 mole) in anhydrous toluene (30 ml.) was heated under reflux for nine days; infrared spectrum indicated almost complete conversion to amide. The reaction mixture was first distilled under water vacuum to remove toluene and subsequently under high vacuum to remove excess phenylpiperazine. The resulting oil was dissolved in isopropanol (100 ml.), the solution was treated with charcoal and reevaporated to dryness to yield the crude amide (oil, 10 g.). A solution of the crude amide in anhydrous tetrahydrofuran (50 ml.) was added dropwise to a suspension of lithium aluminum hydride (2.28 g., 0.06 mole) in anhydrous tetrahydrofuran while cooling in ice bath. After addition was complete, the reaction mixture was heated under reflux for 16 hours. The reaction mixture was cooled and excess lithium aluminum hydride was destroyed by the slow successive addition of water (2.5 ml.), sodium hydroxide (5 N, 2 ml.) and additional water (8 ml.) under nitrogen atmosphere. After the decomposition was complete, the mixture was heated under reflux for one-half hour and filtered. The precipitated salts were well washed with chloroform (ca. 100 ml.) and the combined chloroform-tetrahydrofuran solution was washed with water (2 x 10 ml.), dried over sodium sulfate and evaporated to dryness to yield an oil (9.5 g.). The product (4.4 g., M.P. 69–72°) slowly crystallized from isopropanol-isopropyl ether (1:1, 20 ml.). Recrystallization from isopropanol (15 ml., charcoal) gave the desired compound (3.5 g., M.P. 71–74°).

Ultraviolet spectrum: $\lambda_{max.}^{MeOH}$ 234 m$\mu$ ($\epsilon$, 15,000), 279 m$\mu$ ($\epsilon$, 4,500), shoulder at 245 m$\mu$.

EXAMPLE 6

*1-methyl-5-(3,4-dimethoxyphenyl)pyrrolidine-2-N-ethylcarboxamide*

A solution of 1-methyl-5-(3,4-dimethoxyphenyl)pyrrolidine-2-carboxylate (8.4 g., 0.03 mole) was saturated with anhydrous monoethylamine at ice bath temperature and stored at room temperature for five days. The solution was resaturated with ethylamine and stored at room temperature for seven additional days. The solution was evaporated to dryness; the resulting oil (8.3 g.) was dissolved in isopropanol (reagent grade, 20 ml.), ethanolic hydrochloric acid (9 N, 4.5 ml.) was added, the solution was evaporated to dryness and the product (9.5 g., M.P. 84–86°, hygroscopic) was crystallized from isopropanol-isopropyl ether (1:1, 30 ml.). The hydrochloride obtained was dissolved in water (10 ml.), the pH was adjusted to 9 with saturated sodium carbonate solution and the mixture was extracted with chloroform (4 x 40 ml.); the chloroform solution was washed with water, dried over sodium sulfate and evaporated to dryness. The resulting oil was twice distilled under high vacuum to give the desired compound (4.2 g.; B.P. ca. 165°/0.1 mm.; $n_D^{24}$ 1.5395). The product crystallized on standing; M.P. 52–54°.

Ultraviolet spectrum: $\lambda_{max.}^{MeOH}$ 230 m$\mu$, 280 m$\mu$.

EXAMPLE 7

*1-methyl-5-(3,4-dimethoxyphenyl-2-aminomethylpyrrolidine*

1-methyl-5-(3,4-dimethoxyphenyl)pyrrolidine-2-carboxamide hydrochloride (7.3 g., 0.024 mole) was dissolved in water (10 ml.); the solution was rendered alkaline to pH 9 with saturated sodium carbonate solution and was extracted with chloroform (3 x 50 ml.). The chloroform extract was dried over sodium sulfate and evaporated to dryness. A solution of the resulting oil (5.5 g.) in tetrahydrofuran (50 ml.) was added dropwise to a cooled suspension of lithium aluminum hydride (1.82 g.) in 50 ml. tetrahydrofuran. The resulting suspension was heated under reflux for 15 hours. The reaction mixture was cooled and the excess lithium aluminum hydride was destroyed by the slow successive addition of water (2.5 ml.), 5 N sodium hydroxide (2 ml.) and water (8 ml.). The mixture was again heated under reflux for one-half hour. The gel was removed by filtration and washed well with chloroform. The combined chloroform-tetrahydrofuran solution was washed with water, dried over sodium sulfate, and evaporated to dryness. The resulting oil was distilled under reduced pressure to give the desired product (3.5 g.; B.P. 125–128°/0.05 mm.).

Analysis for $C_{14}H_{22}N_2O_2$—Calc'd: C, 67.17; H, 8.86; N, 11.19. Found: C, 67.16; H, 8.86; N, 11.38.

EXAMPLE 8

*1-methyl-5-(3,4-dimethoxyphenyl)pyrrolidine-2-carbohydrazide*

A solution of 1-methyl-5-(3,4-dimethoxyphenyl)pyrrolidine-2-carboxylate (5.6 g., 0.02 mole) and hydrazine hydrate (4 ml.) was stirred at room temperature for 4 days. The solution was evaporated to dryness and the residue was distilled under high vacuum to give the desired product (3.9 g.; B.P. 185°/0.1 mm.).

EXAMPLE 9

*1-methyl-5-(3,4-dimethoxyphenyl)-2-hydroxy-methylpyrrolidine*

A solution of methyl 1-methyl-5-(3,4-dimethoxyphenyl)-2-pyrrolidinecarboxylate (2.8 g., 0.01 mole) in dry tetrahydrofuran (20 ml.) was added dropwise to a cooled suspension of lithium aluminum hydride (1.14 g., 0.03 mole) in dry tetrahydrofuran (30 ml.) The resulting suspension was heated under reflux for three hours. The reaction mixture was cooled and excess lithium aluminum hydride was destroyed by the slow successive addition of water (1.5 ml.), 5 N sodium hydroxide (1 ml.) and water (4 ml.). The mixture was again heated under reflux for one half hour. The gel was removed by filtration and was washed well with chloroform. The combined chloroform tetrahydrofuran solution was washed with water, dried over sodium sulfate and evaporated to dryness. The resulting oil (2.6 g.) was distilled under high vacuum to give the desired product (1.7 g., B.P. 126–127°/0.05 mm.). The product crystallized on standing (M.P. 44–47°).

Analysis for $C_{14}H_{21}NO_3$.—Calc'd: C, 66.90; H, 8.42; N, 5.58. Found: C, 66.95; H, 8.53; N, 5.48.

What is claimed is:

1. A compound selected from the group consisting of pyrrolidine derivatives of the formula

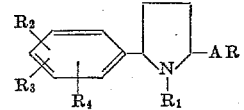

wherein:

A is selected from the group consisting of CO and CH$_2$,

R is a member selected from the group consisting of hydroxy, lower alkoxy, monocarbocyclic aryl-loweralkoxy, amino, hydrazino, lower-alkylamino, di-lower-alkylamino, pyrrolidino, piperidino, morpholino, piperazino, lower alkyl-piperazino and monocarbocyclic aryl piperazino;

R$_1$ is lower alkyl;

R$_2$, R$_3$ and R$_4$ are chosen from the group consisting of chlorine and bromine, hydroxy, amino, lower alkyl, lower alkoxy and methlenedioxy when two adjacent R symbols are joined together, and the pharmaceutically acceptable acid addition salts thereof.

2. Methyl 1-methyl-5-(3,4-dimethoxyphenyl)pyrrolidine-2-carboxylate.

3. 1-methyl-5-(3,4-dimethoxyphenyl)pyrrolidine-2-carboxamide.

4. 1-methyl-5-(3,4-dimethoxyphenol)pyrrolindine-2-carboxylic acid.

5. 1-methyl-5-(3,4-dimethoxyphenyl)-2-(morpholinomethyl)pyrrolidine.

6. 1-methyl-5-(3,4-dimethoxyphenyl)-2[(4-phenylpiperazino)methyl]pyrrolidine.

7. 1-methyl-5-(3,4-dimethoxyphenyl)pyrrolidine-2-N-ethylcarboxamide.

8. 1-methyl-5-(3,4-dimethoxyphenol)-2-aminomethyl pyrrolidine.

9. 1-methyl-5-(3,4-dimethoxyphenyl)pyrrolidine-2-carbohydrazide.

10. 1-methyl-5-(3,4-dimethoxyphenyl)-2-hydroxymethylpyrrolidine.

References Cited by the Examiner
UNITED STATES PATENTS
3,164,597  1/1965  Leonard _____ 260—268

NICHOLAS S. RIZZO, *Primary Examiner.*

HENRY R. JILES, JOSE TOVAR, *Assistant Examiners.*